United States Patent [19]

Buchanan

[11] 3,987,418

[45] Oct. 19, 1976

[54] CHIP TOPOGRAPHY FOR MOS INTEGRATED CIRCUITRY MICROPROCESSOR CHIP

[75] Inventor: John K. Buchanan, Tempe, Ariz.

[73] Assignee: Motorola, Inc., Chicago, Ill.

[22] Filed: Oct. 30, 1974

[21] Appl. No.: 519,147

[52] U.S. Cl. .............................................. 340/172.5
[51] Int. Cl.² .......................................... G06F 1/00
[58] Field of Search ...................... 340/172.5; 445/1

[56] References Cited
UNITED STATES PATENTS

| | | | |
|---|---|---|---|
| 3,579,201 | 8/1971 | Langley | 340/172.5 |
| 3,716,843 | 2/1973 | Schmitt et al. | 340/172.5 |
| 3,757,306 | 9/1973 | Boone | 340/172.5 |
| 3,757,308 | 9/1973 | Fosdick | 340/172.5 |
| 3,758,761 | 9/1973 | Henrion | 235/153 AK |
| 3,760,367 | 9/1973 | Kortenhaus | 340/172.5 |
| 3,760,369 | 9/1973 | Kemp | 340/172.5 |
| 3,798,606 | 3/1974 | Henle et al. | 340/172.5 |
| 3,821,715 | 6/1974 | Hoff et al. | 340/172.5 |
| 3,832,694 | 8/1974 | Judith | 340/172.5 |
| 3,896,418 | 7/1975 | Brown | 340/172.5 |
| 3,906,453 | 9/1975 | Mattedi et al. | 340/172.5 |
| 3,912,947 | 10/1975 | Buchanan | 307/269 |
| 3,962,682 | 6/1976 | Bennett | 340/172.5 |

Primary Examiner—Gareth D. Shaw
Assistant Examiner—Jan E. Rhoads
Attorney, Agent, or Firm—Harry M. Weiss; Charles R. Hoffman

[57] ABSTRACT

The chip architecture of an MOS microprocessor chip includes data bus input-output buffer circuitry located along the lower right hand edge of the chip. High order address buffer output circuitry is located along the bottom of the chip. Directly to the left of the data bus input-output buffer circuitry is the arithmetic logic unit circuitry, and to the right of this and adjacent to the high order address bit buffer circuitry is located a register section including first accumulator register, a second accumulator register, high and low order index registers, a high order incrementer and an associated program counter, a low order incrementer and associated program counter, a high order stack pointer register and a low order stack pointer register, and a temporary register arranged on the surface of the microprocessor chip in a particular sequence. To the left of the register section and along the lower left hand edge of the chip is located a plurality of low order address bit buffer circuits. Above and coupled to the register section and to the arithmetic logic unit is located a plurality of bootstrap driver circuits for driving signals which enable programmed data transfers between the various registers, the arithmetic logic unit and a plurality of internal data bus and address bus conductors coupled to the data bus input-output buffer circuitry and the high order and the low order address bit buffer circuits, respectively. Read/write circuitry, a condition code register, decision logic circuitry, and an instruction register are located in sequence along the upper righthand edge of the chip. To the left of the decision logic circuitry and the condition code register and above the bootstrap driver circuitry and coupled thereto is a logic control circuitry section. Above the logic control circuitry and along the upper edge of the chip to the left of the instruction register is located an instruction decoder circuitry section. Along the upper lefthand edge of the chip is located input-output control circuitry and look-ahead circuitry for the instruction decoder. Between the lefthand portion of the logic control circuitry and the right hand portion of the I/O control circuitry is located timing generator circuitry coupled to the logic control circuitry for enabling the selected logic gates therein, which are selected and driven by the instruction decoder.

9 Claims, 9 Drawing Figures

CHIP TOPOGRAPHY FOR MOS INTEGRATED CIRCUITRY MICROPROCESSOR CHIP

BACKGROUND OF THE INVENTION

An important factor in the economical manufacture of MOS LSI integrated circuits is reducing the amount of silicon required to produce the semiconductor chips on which the integrated circuits are fabricated. MOSFET devices and the interconnection pattern of conductors therebetween must be optimized to provide the highest functional component density in order to reduce the chip area per circuit function. Minimum geometry spacings between metallization lines, diffused regions and polycrystalline silicon conductors must be maintained, yet the length of such lines and the associated capacitances must be minimized as complex interconnection patterns are implemented. Parasitic electrical leakage paths in the circuit must be minimized or compensated for in the chip topology. A very high degree of creativity is required of the chip architect in order to choose a particular layout and interconnection pattern for an LSI circuit from the large number of possibilities that exist for arranging such a layout. Frequently, the commercial success of an MOSLSI product may hinge on the ability of the chip architect to achieve an optimumized chip topography.

SUMMARY OF THE INVENTION

It is an object of this invention to provide improved semiconductor chip topography for an integrated circuit MOS microprocessor chip.

It is another object of this invention to provide minimum chip size for an integrated circuit microprocessor chip and minimum length of interconnection conductors on the surface of the microprocessor chip.

It is another object of the invention to provide a microprocessor chip having a register section and an adjacent arithmetic logic unit located such that it is substantially surrounded by data input-output buffer circuitry and address output buffer circuitry located along the periphery of the chip and bootstrap driver circuitry located adjacent to the logic control circuitry section.

It is another object of the invention to provide a chip topography for a microprocessor chip in which the various logic circuitry and register sections are situated so that information flows substantially directly from a given circuit section to an adjacent circuit section during execution of an instruction.

Briefly described, the invention is an MOS LSI microprocessor chip having optimumized chip topography. The chip topography includes a register section adjacent to address output buffer circuitry located along the periphery of the chip. The register section is coupled to data bus input/output buffer circuitry located along the periphery of the chip. In one embodiment the arithmetic logic unit is situated on a surface of the chip between the register section and the data bus input/output buffer circuitry. The register section is coupled to and adjacent to a bootstrap driver section, which is coupled to and adjacent to a logic control section which in turn is adjacent to an instruction decoder section located along the periphery of the chip. Timing generator circuitry and input/output control circuitry are located substantially along the periphery of the chip and adjacent to the logic control section. Decision control logic and a condition code register are located adjacent to the logic control circuitry at opposite side thereof. In a preferred embodiment of the invention, a voltage distribution conductor includes a first branch for supplying voltage to register circuitry and a second branch for supplying voltage to address output buffer circuitry and data bus input/output buffer circuitry located along the periphery of the surface of the chip. The bonding pad sequence is selected to allow optimum arranging of packages containing the microprocessor chip on a printed circuit board and to facilitate optimizing the microprocessor chip topography.

DESCRIPTION OF THE INVENTION

The subject matter described herein is related to the subject matter of copending patent application INTEGRATED MICRO-PROCESSOR WITH INSTRUCTION LOOK-AHEAD ARCHITECTURE, Ser. No. 519,150, filed on even date herewith and assigned to the assignee of the present invention.

Figure 2:
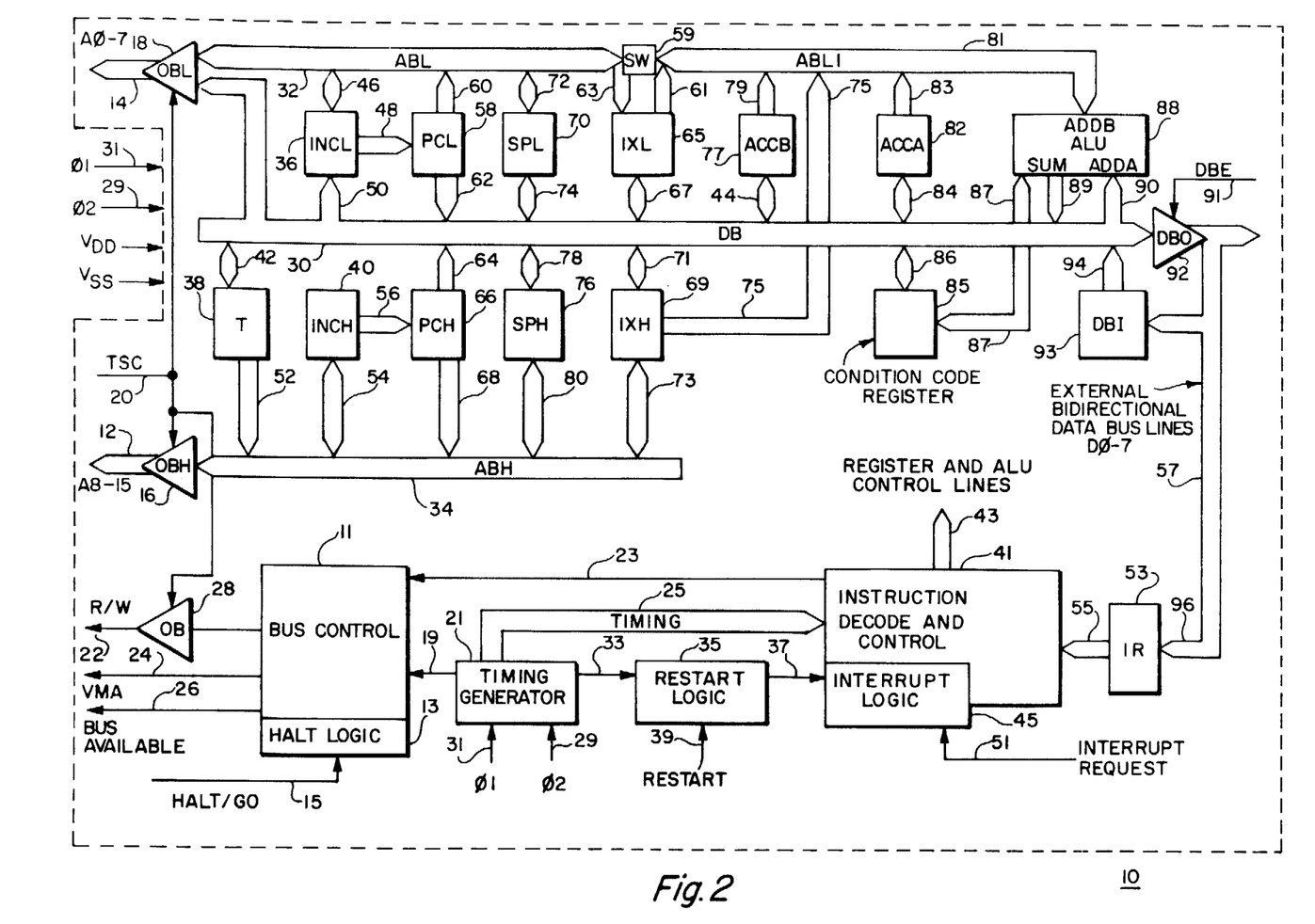
FIG. 2 is a functional block diagram of an integrated circuit microprocessor chip, the integrated circuit topography of which is the subject of the invention.

FIG. 2 is a functional block diagram of an integrated circuit microprocessor chip, the topology of which is the subject of the present invention. For a more complete description of the circuitry, structure, and operation of the microprocessor of FIG. 2, refer to the above mentioned copending patent application.

In FIG. 2, it is seen that the low order output bus 14, including conductors Aφ–A7, is driven by eight Output Bus Low (OBL) buffers 18 and high order address bus 12 (A8–A15) is driven by eight Output Bus High (OBH) buffers 28. OBH buffers 28 and OBL buffers 18 are enable by Three-State Control (TSC) conductor 20, as is Read/Write (R/W) output buffer 28, which is connected to and drives R/W (Read/Write) conductor 22. R/W buffer 28 has an input connected to bus conrol logic circuitry 11. Output Bus Low (OBL) buffers 8 are respectively driven by lower order address conductors i.e., Address Bus Low (ABL) conductors 32 and internal Data Bus (DB) conductors 44. Further description of the address output buffer circuit means are set forth in material from page 21, line 20 to page 27, line 11 of copending application Ser. No. 519,150.

It will be noted that the pointed ends of the various buses in FIG. 2 indicate the possible directions of the data flow thereon.

OBH buffers 16 are driven by Address Bus High (ABH) conductors 34. Incrementer Low (INCL), reference numeral 36, is connected between ABL Bus 32 and Data Bus 30. It should be understood that sections such as 46 anad 50 which couple INCL to ABL and DB, respectively, indicate the data transfer directions possible by means of coupling circuitry and bus conductors understood to be associated with the registers or counters such as INCL, PCL, SPH, etc. It will be convenient to consider sections 46 and 50 as representing coupling circuitry and the arrow tips as indicating possible directions of data transfers through the specific coupling circuitry. The Program Counter (PC) includes Program Counter Low (PCL), designated by reference numeral 58, and Program Counter High (PCH), indicated by reference numeral 66. PCL is coupled between ABL, reference numeral 32, and DB, reference numeral 30, by coupling circuitry 60 and 62 and is coupled to INCL by coupling circuitry 48. Similarly, PCH is coupled between DB, reference numeral 30, and ABH, reference numeral 34, by coupling circuitry 64 and 68 and is coupled to INCL by coupling circuitry 56. The coupling circuitry 56 may, of course, include bus conductors.

Program Counter (PC), including Program Counter Low (PCL), reference numeral 58 and Program Counter High (PCH), reference numeral 66, is actually a program register, in presently preferred embodiment of the invention. Its contents are updated by INC, which includes INCL, reference numeral 36 and INCH, reference numeral 40, and which may be regarded as counter means. Counter means, generally speaking, may be an incrementer or a decrementer, or in the most general sense, an up counter or a down counter.

The stack pointer includes Stack Pointer Low (SPL) register 70 and Stack Pointer High (SPH) register 76. SPL is coupled between ABL and DB by coupling circuitry 72 and 74, respectively. SPH is coupled between DB and ABH by coupling circuitry 78 and 80, respectively. The index register includes Index Register Low (IXL) register 65 and Index Register High (IXH) register 69. (Note that the terms "high" and "low" as used herein refer to registers coupled, respectively, to the high order and low order address buses, ABL (A$\phi$ – A7) and ABH (A8 – A15), respectively. IXH is coupled between DB and ABH by coupling circuitry 71 and 73, respectively. IXL is coupled between ABL and DB by coupling circuitry 63 and 67. An additional low order address bus (ABL1, reference numeral 81), is connected to ABL by switching circuit (SW) reference numeral 59. IXL is coupled to ABL1 by coupling circuit 61. IXH is coupled to ABL1 by coupling circuitry 75. Accumulator B, (ACCB), reference numeral 77, is connected between ABL1 and DB by coupling circuits 79 and 44, respectively. Accumulator A, (ACCA), reference numeral 82, is connected between ABL1 and DB by coupling circuits 83 and 84, respectively. Condition code register 85, is connected to DB by coupling circuitry 86 and is connected to arithmetic logic unit, (ALU), 88 by coupling circuitry 87. ALU is connected to ABL1 and is connected to DB by coupling circuitry 89 and also by coupling circuitry 90. External data bus D$\phi$–D7, reference numeral 57, is coupled to internal data bus DB reference numeral 30, by Data Bus output (DBO) buffers 92, which are enable by DBE (Data Bus Enable) input conductor 91. External data bus 57 is also coupled to data input register Data Bus Internal (DBI), reference numeral 93, which is coupled to DB.

Bus control circuitry 11 is connected to Read/Write Output Buffer (OB), 28 and generates the R/W signal on conductor 22, and also generates the Valid Memory Address (VMA) signal on conductor 24 and the Bus Available (BA) signal on conductor 26. Bus control circuitry 11 is connected to halt logic circuitry 13, which is driven by the input Halt/Go signal on conductor 15. Timing generator 21 generates control signals on conductor 19 which controls bus control circuitry 11.

Timing generator 21 has clock signals $\phi$1 applied to conductor 31 and $\phi$2 applied to conductor 29. Timing generator 21 also generates timing signals on conductors 25 which are connected to instruction decode and control circuitry 41 and interrupt logic 45 which is also connected to instruction decode and control circuitry 41. Instruction Register (IR), reference numeral 53, is coupled between external data bus 57 and instruction decode and control circuitry 41 by coupling circuitry 96 and 55, respectively. Instruction decode and control circuitry 41 generates a plurality of control signals on conductors 42 which are understood to be dispersed throughout the registers, buses, and arithmetic logic unit circuitry and the various coupling circuits associated therewith to control, in proper sequence, the necessary data transfers required during execution of various microprocessor instructions. These connections are shown in FIG. 3 of the above-mentioned copending patent application, but not in FIG. 2. Temporary register 38, designated by letter T, is coupled to DB and ABH by coupling circuits 42 and 52, respectively.

Figure 3:
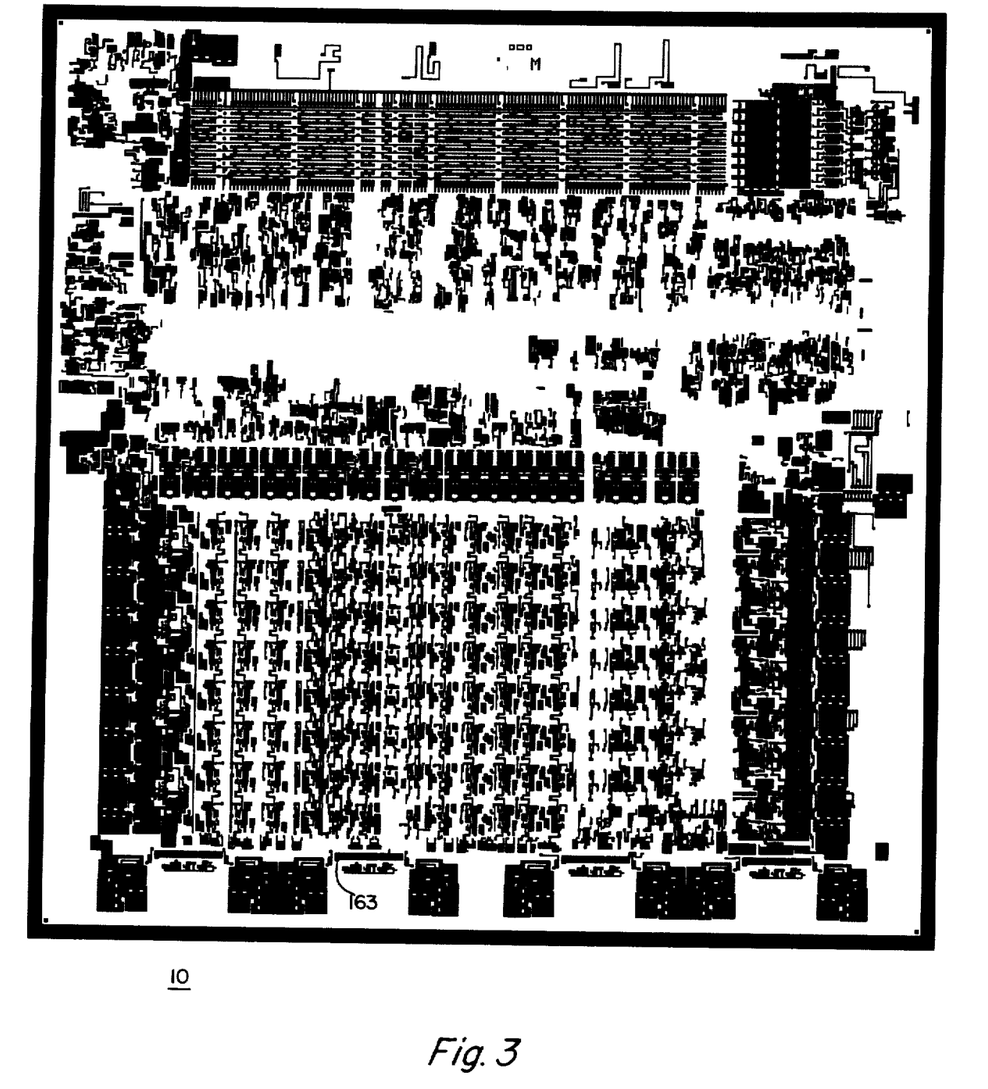
FIG. 3 is a scale drawing of a photomask utilized to pattern source-drain diffusion regions in the manufacture of a microprocessor chip according to the invention.

FIG. 3 is a drawing of a source-drain diffusion mask utilized in manufacturing the presently preferred embodiment of the invention for an N-channel silicon gate MOS manufacturing process. The darkened areas on a chip such as area 163 designate the source regions, the drain regions and the channel regions of subsequently formed MOSFETs. More detailed description of the instruction decode and control circuitry is set forth on page 17, lines 9–17, of copending patent application Ser. No. 519,150. The long, slender lines, such as 161, designate diffused conductors.

Figure 4:
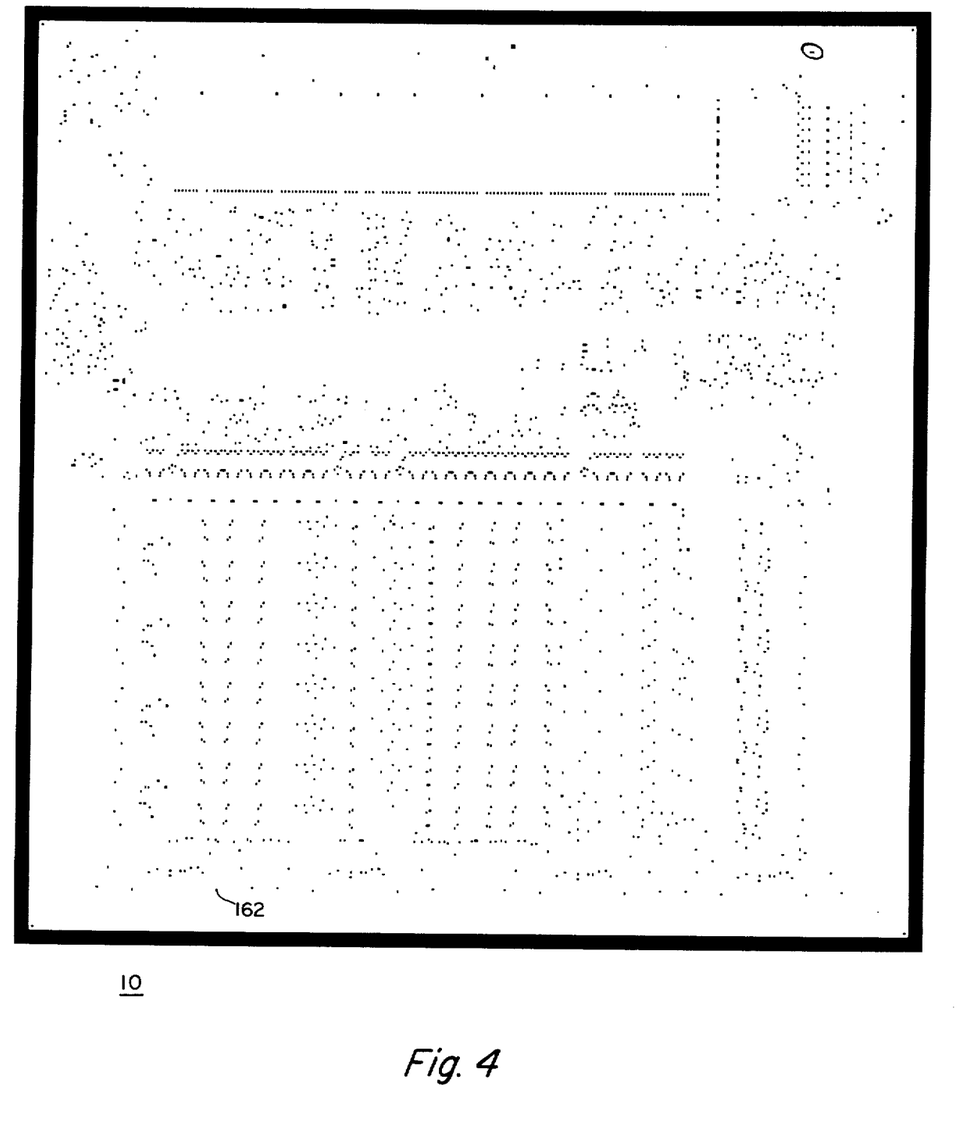
FIG. 4 is a scale drawing of a polycrystalline silicon-to-source-drain diffused region preohmic mask used in manufacture of a microprocessor chip according to the invention.
Figure 5:
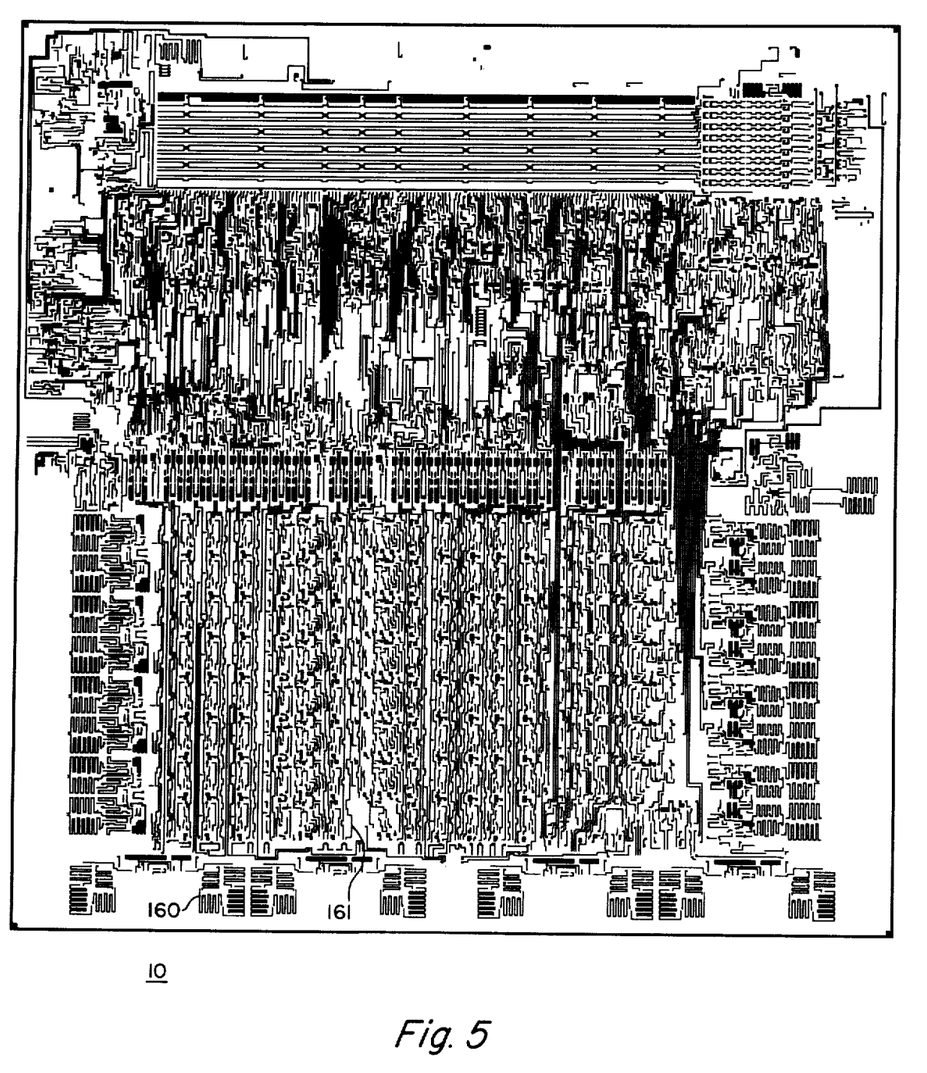
FIG. 5 is a scale drawing of a photomask used to pattern a polycrystalline silicon layer on a microprocessor chip according to the invention.
Figure 7:
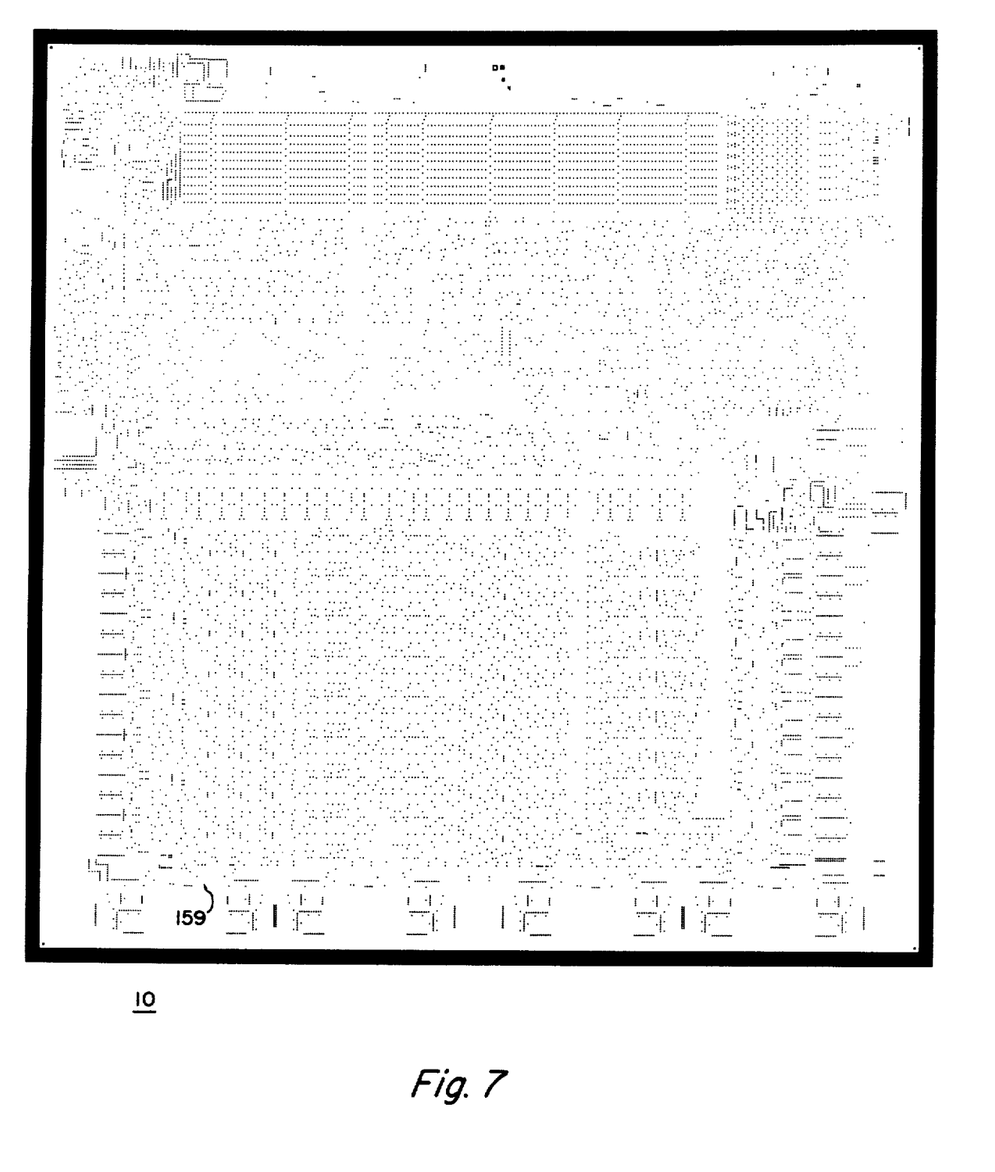
FIG. 7 is a scale drawing of a photomask used to pattern preohmic openings between diffused regions and interconnection metallization during manufacture of a microprocessor chip according to the invention.
Figure 8:
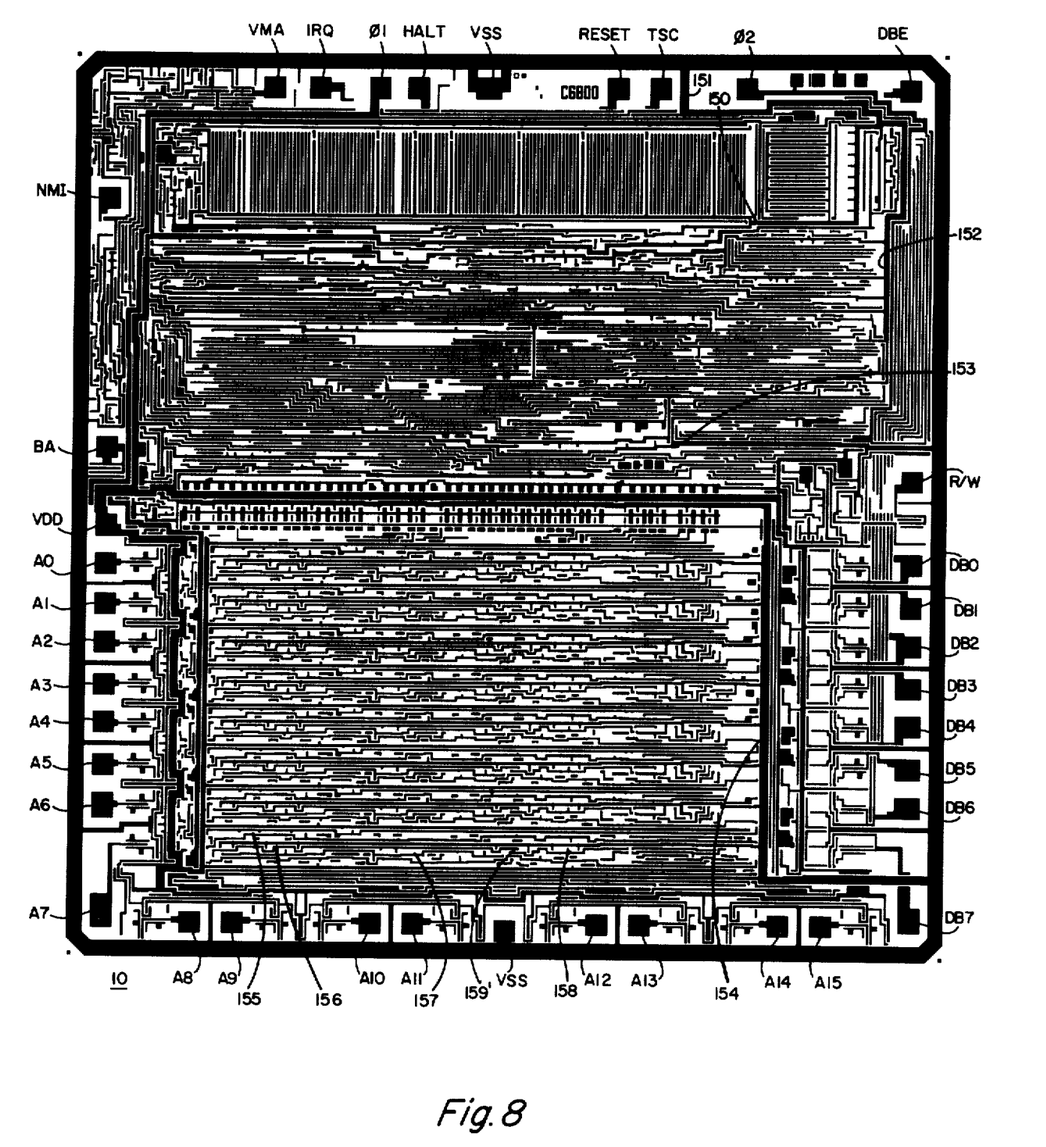
FIG. 8 is a scale drawing of a photomask used to pattern a metal interconnection layer of a microprocessor chip according to the invention.

The first preohmic mask 10B is illustrated in FIG. 4 and is applied in the manufacturing process after the source-drain mask in FIG. 3 is applied and after the polycrystalline silicon mask shown in FIG. 5 is applied. The darkened areas such as 162 indicate where polycrystalline silicon-to-diffused region contacts are made. After the oxide initially on the semi-conductor wafer is patterned using mask 10A of FIG. 3, an oxide is thermally grown in the regions where silicon is exposed as a result of application of mask 10A. Then polycrystalline silicon is deposited on the entire wafer, and mask 10C, in FIG. 5 is applied to pattern the polycrystalline silicon and the underlying oxide and the source-drain-channel region. The darkened regions, such as 160 and 161 in FIG. 5 represent either gate electrodes of MOS- FETs or polycrystalline silicon conductors. For example, the conductor 161 is not a gate electrode, but instead is a polycrystalline silicon line utilized as an interconnection conductor. Mask 10D, shown in FIG. 7, is applied after the source and drain regions and the polycrystalline silicon conductors are diffused. The dark spots, such as 159 in FIG. 5 indicate where the subsequent metallization pattern, defined by mask 10E in FIG. 8, is required to contact either polycrystalline silicon conductors or diffused silicon conductors. The metallization interconnection pattern 10E, as previously mentioned, defines the metal interconnection pattern for the microprocessor chip 10, according to the invention. The information disclosed by FIGS. 3–8 includes the geometry and interconnections of all MOSFETs of a presently preferred embodiment of the microprocessor circuit and would enable one skilled in the art to produce the microprocessor.

Figure 1:
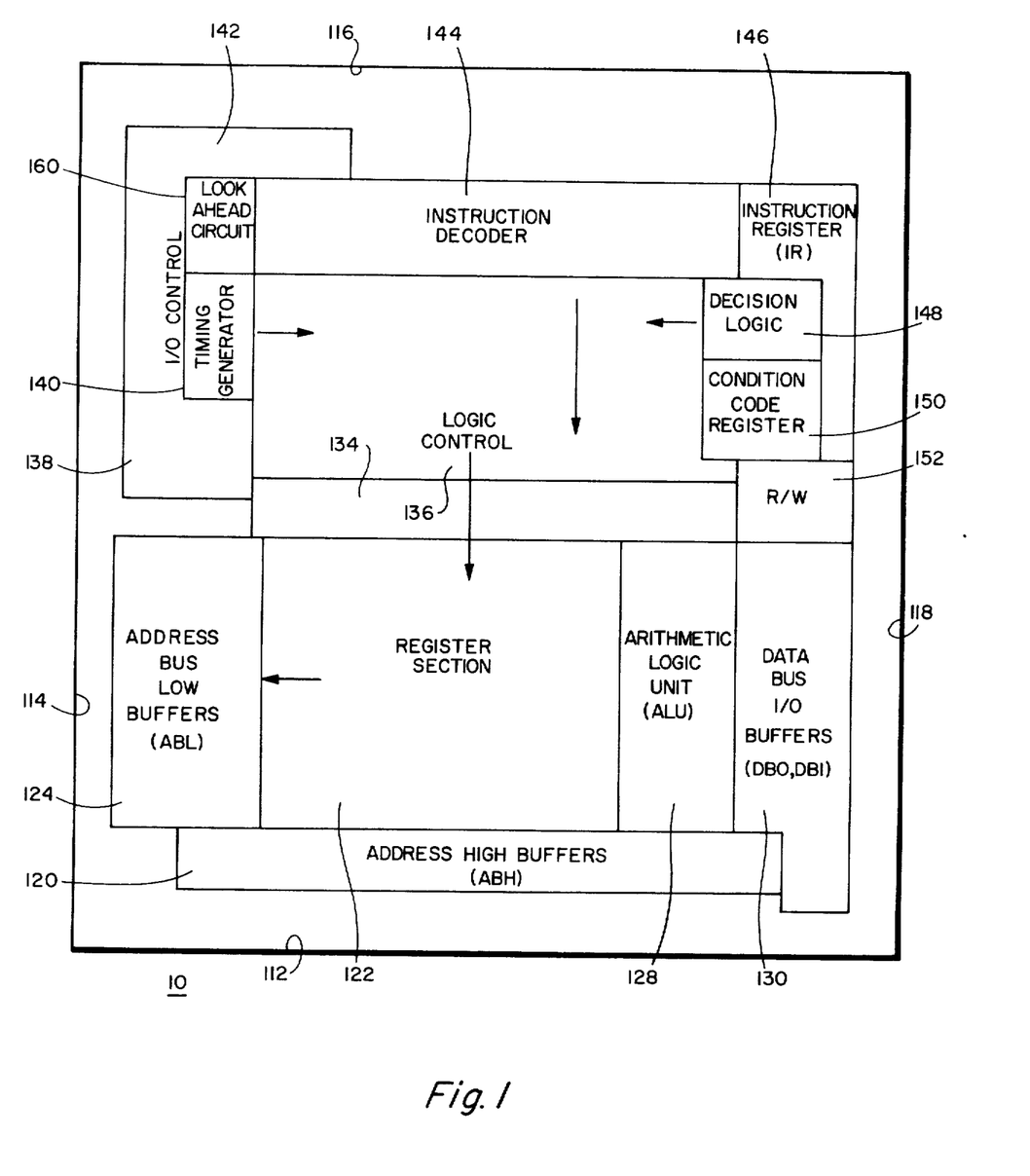
FIG. 1 is a block diagram illustrating the general location of circuit sections on an integrated circuit microprocessor chip.
Figure 6:
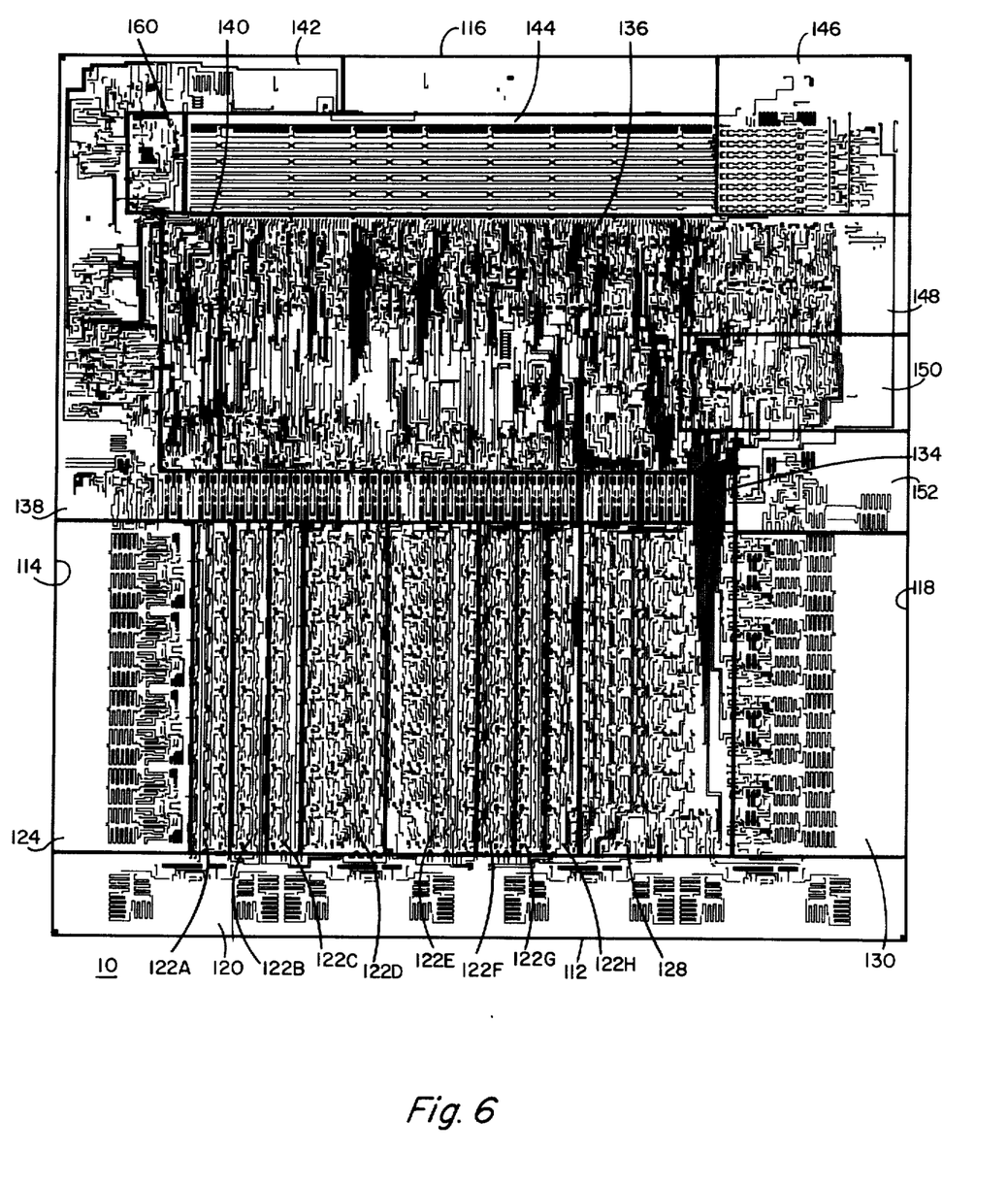
FIG. 6 is a scale drawing identical to FIG. 5 except that circuit sections similar to those in FIG. 1 are identified and blocked out with heavy lines to show their precise location on microprocessor chip.

Referring now to FIGS. 1 and 6, Address Buffer Low section 124 is located in the lower left hand corner of microprocessor chip 19 adjacent to edge 114. Note that the chip has bottom edge 112, left hand edge 114, top edge 116, and right hand edge 118. The Address Buffer High section 120 is located along the bottom edge 112 of chip 10. Register section 122 of microprocessor chip 10 includes all of the counters and registers including the temporary register, the stack pointer registers SPH and SPL, the program counters PCL and PCH, the incrementers INCH and INCL, the index registers IXH and IXL, and the accumulators ACCB and ACCA. For a description of the operation of the various registers shown in FIG. 1, see copending patent application Ser. No. 519,150, filed on even date herewith, especially page 12, line 5 to page 14, line 9 and page 17, line 20 to page 18, line 8. It should be noted that a complete logic diagram of the microprocessor is set forth in FIGS. 3A–3TT of Ser. No. 519,150. Register section 122 occupies a large portion of the lower half of the chip. It is adjacent to ABL and ABH address buffers 124 and 120. The data bus conductors are distributed horizontally through register section 122 as are ABH and ABL, which are connected, respectively, to OBL and OBH, respectively. Each of the buses ABL, ABH, ABL1, and DB are eight bits (one byte) wide in the illustrated presently preferred embodiment of the invention. Also, each of the registers INCL, INCH, PCL, PCH, SPL, SPH, IXL, IXH, T, ACCA, ACCB are eight bits in length as shown in FIGS. 3–8. In order to minimize the length of metal conductors, OBL and OBH surround register section 122 in a manner which prevents crowding of the address buffer circuits and minimizes the length of the address bus conductors to the inputs of the address buffer circuits.

The bootstrap driver circuit section 134 is located along the upper edge of register section 122 and adjacent thereto. Bootstrap drivers 134 provide a plurality of enable signals which are generated by gating logic circuitry 136 and which must be distributed through the register seciton 122 to cause the various data transfers required in execution of an instruction. More detail of the bootstrap driver circuits is shown in FIGS. 3F, 3T, 3U, and 3V of copending application Ser. No. 519,150. In order to minimize the length of conductors from the bootstrap circuit outputs to coupling circuitry between the various registers and AB or DB, it is necessary that the bootstrap section 134 be located along a wide side of a register section 122. Logic control circuitry section 136 is located on a surface of microprocessor chip 10 above and adjacent to bootstrap driver section 134 and provides signals which are inputs to the bootstrap driver circuits in section 134. Therefore, it is necessary that logic control circuitry section 36 be adjacent to bootstrap driver section 34 in order to minimize length (and parasitic capacitance) of conductors coupling the two sections.

Instruction decoder section 144 is located adjacent to the upper side of logic control circuitry section 136 and develops therein signals which, in combination with timing and control signals from I/O (Input/Output) control section 138 and timing generator section 140 act as inputs to the logic gates in section 136. The Arithmetic Logic Unit (ALU), reference number 128, is located on the right hand edge 118 of register section 122.

Data Bus I/O input buffer circuitry section 130 is located on the right hand edge 118 of arithmetic logic unit section 128 and is coupled to the data bus input conductors D$\phi$–D7. In order to minimize the length of these connections it is necessary that Data Bus Input Circuitry (DBI) be located as close as possible to the bonding pads. Since the outputs of the data bus input buffers in Section 130 are the internal data bus conductors DB, it is desirable that the arithmetic logic unit 128 be located close to the data bus input buffers, since, as is seen in FIG. 2, the internal data bus DB is coupled directly to the ADDA input of the arithmetic logic unit and the outputs of the arithmetic logic unit are coupled by coupling circuitry 89 (in FIG. 2), to the internal data bus DB. More detailed information on the data bus I/O input buffer circuitry is set forth on page 21, line 20 to page 27, line 11 of copending application Ser. No. 519,150; also see U.S. Pat. No. 3,912,947 by John Buchanan, filed on July 5, 1974, and assigned to the instant assignee. Instruction register 146 is located adjacent to the right hand side of instruction decoder section 144 which is essentially a ROM array comprising a plurality of multi-input NOR gates whose outputs are the inputs to the logic control circuitry in Section 136 generating the enabling signals for the various instructions which are decoded. It is desirable that instruction register 146 be located along the edge 118 of microprocessor chip 10 to minimize the length of the conductors from the data bus input pads D$\phi$–D7.

The look-ahead logic circuitry in section 160 which enables look-ahead precharging of the conductors in instruction decoder section 144 is located at the right hand side of instruction decoder section 144. This is because it needs to be located at the narrow end of instruction decoder 144, and also because it is controlled by signals from the logic control section 138, which is located in the general upper left hand section of microprocessor chip 10.

Timing generator circuitry 140 is located in the same general area as timing generator circuitry 138. Timing generator circuitry and timing control circuitry 140 and 138 are necessary to generate signals which are distributed by generally horizontal conductors extending from left to right through logic control circuitry 136 to provide appropriate enabling signals to those gates to allow driving and selection of the proper bootstrap circuits in section 134 which enable the appropriate data transfers between registers and buses in register section 22. This location is necessary to provide minimum conductor lengths for said enabling signals.

In general, the flow of data is from the data input conductors D$\phi$–D7 to the instruction register 146. The contents of instruction register 146 are then decoded by the instruction decoder 144 to generate signals which propagate from the top of the chip downward through the logic control section 136 enabled by control signals generated by I/O control section 138 and timing generator circuit 140 to select the proper bootstrap driver circuits in section 134, which in turn provide drive signals which propagate downward into register section 122 enabling appropriate data transfers between registers and the data bus and the address bus and other buses. The data on the address buses are then transferred to the address output buffers and finally to the address output bonding pads along edges 114 and 112 of microprocessor chip 10. The length of the various signal conductors is minimized by arranging the instruction decoder section 146, the logic control circuitry section 136, the bootstrap driver section 134 and the instruction decoder section 122 and the address buffer sections 124 and 120 in a progressive fashion on the surface of the chip 10 as shown in FIGS. 1 and 6.

The remaining section in FIG. 1 and 6 is I/O control circuitry section 142. The condition code register circuitry 150 and decision logic circuitry 148 stores data in response to signals on the data bus input signals and generates signals which qualify signal propagation to logic control circuitry section 136, and therefore are located as close as possible to data bus conductors along edge 118 and are also located at the right hand end of logic control circuitry section 136 in order to minimize the length of various conductors associated therewith.

It is conventional to make the number one pin of a dual-in-line package be the $V_{SS}$ pin. Referring to FIG. 8 two $V_{SS}$ bonding pads are provided on the chip, to compensate for the substantial amount of current drawn from the external $V_{SS}$ power supply (not shown) during operation of the chip and due to the fact that it is implemented using a low threshold voltage N channel MOS manufacturing process. Because of the low threshold voltages of the latter process, voltage variation along the $V_{SS}$ conductor may be large enough to impair the noise immunity of the microprocessor circuitry on chip 10.

To further decrease the possibility of external noise being coupled to register circuits in the register section 122 or gating circuits in the logic control section 136, separate branches of the $V_{SS}$ conductor are utilized to distribute the $V_{SS}$ voltage to the address output buffer section 124 and 120 data bus input/output buffer section 130 and to the register section 122 and random logic section 136. Referring again to FIG. 8, it is seen that extensions of the peripheral $V_{SS}$ supply bus that circumscribes the chip are utilized to provide voltage to the address output buffers in sections 120 and 124 and to the data bus input/output buffers in section 130. Examples of such extensions are indicated in FIG. 8 by reference numerals 170, 171, and 172. It is also seen that extension 154 of the $V_{SS}$ conductor is utilized to provide the $V_{SS}$ voltage to register section 122 and extensions 150, 152, and 153 are used to distribute the $V_{SS}$ voltage to control logic circuitry 136 and other circuitry in that portion of the chip. Thus, it is seen that the $V_{SS}$ distribution system provides relatively wide metal lines and consequently very low impedence to the logic circuitry and control circuitry. Thus, the voltage drop in the $V_{SS}$ distribution system due to current drawn by the address output buffers and data bus I/O buffers in section 130 is not drawn across any narrow, long sections of any $V_{SS}$ conductor and consequently voltage drops of substantial magnitude across portions of $V_{SS}$ conductor which would reduce noise immunity of circuitry on chip 10 are avoided.

In FIG. 8, $\phi 1$ conductor 174 and $\phi 2$ conductor 175 are on opposite sides of $V_{SS}$ conductor 151, which branches into the various conductor sections 150, 152, and 153. This provides good electrical separation of the clock conductors 174 and 175 as they extend through the circuitry of the chip and avoid electrical cross coupling. Note that $\phi$, conductor M4 is the same as conductor 31 in FIG. 2 and $\phi 2$ conductor 175 is the same as conductor 29 in FIG. 2.

In FIG. 8, it is seen that the Data Bus conductors (DB), Address Bus Low conductors (ABL) and the Address Bus High conductors (ABH), and the split address bus low (ABL1) are all metal lines running horizontally across the chip, and are designated, respectively, by reference numerals 155, 156, 157 and 158. Reference numeral 59' indicates the location of the bus switch MOSFET.

Because of the circuit performance specifications required for the microprocessor chip 10, output signals from the low order address bits $A\phi$–A7 (see FIG. 8) need to be as fast (i.e., have as short rise and fall times and delay from the register section) as possible. Therefore, it is desirable that the address bus conductors ABL and ABH be metal, rather than polycrystalline silicon (which is another option for long conductors in an MOS circuit manufacture utilizing the silicon gate process), since polycrystalline silicon conductors have a substantial resistance and therefore, a substantial RC time constant associated therewith. For the execution of certain instructions, it is also desirable that input signals on the data bus input lines DB$\phi$–DB7 be transmitted directly on the data bus input lines DB$\phi$–DB7 be transmitted directly to low order address outputs A$\phi$–A7. Again, this necessitates use of metal lines for the ABL and ABH conductors running through the register section 122. The delay specifications required for the output signals of the ABH conductors A8–A15 are somewhat slower since these outputs, in a system application of microprocessor 10, usually are used for enable signals or chip select signals for peripheral memory devices or peripheral interface devices. Therefore, polycrystalline silicon conductors are utilized to run from register in the register section to the ABH buffers, rather than to the ABL buffers as can be determined from a careful scrutiny of FIGS. 3–8, and by reference to the above-mentioned copending patent application.

Use of metal conductors for DB, ABL, ABH, and ABL1 as described above necessitated the use of polycrystalline silicon conductors for conducting enabling signals from the bootstrap driver circuits in section 134 to coupling devices between the various buses and registers in the register section 122.

The ABL bits A$\phi$–A7 are commonly used as the primary addressing bits for address external random access memory.

It is necessary that arithmetic logic unit 128 in FIG. 6 be situated as closed as possible to the data bus I/O buffers 30, since in operation the microprocessor has a considerable amount of signal flow in both directions between the latter two sections. The arithmetic logic unit 128 also is required to interact with the condition code register 150 and decision logic 148, so that it was advantageous to position those two sections relatively close to ALU. The two accumulators ACCA, reference numeral 122H, and ACCB, reference numeral 122G are closely associated with the operation of the ALU, and are therefore situated on the surface of the chip directly to the left of the ALU, shown in FIG. 6. The index registers INXH and INXL, indicated by reference numeral 122F are located to the left of ACCB, since they communicate with ABL1 and also ABL and ABH. INCH and PCH are arranged together in section 122E. It is highly desirable that these two sections be closely situated on the chip, since, as described in the above mentioned copending patent application, INCH is capable of transferring data directly to PCH rather than through ABH or DB. Analogous comments, hold for the arrangement of INCL and PCL in section 122D of FIG. 6. The remaining available area in the register section is dedicated to the temporary register and to SPL and SPH, designated by reference numerals 122A, 122B, 122c, respectively.

Once the location of the various registers in the register section 122 is established, the positioning of the bootstrap drivers in section 134 is also established, since coupling between the buses and registers in register section 122 is accomplished by means of signals generated by the bootstrap driver. Further, the same considerations determine the layout of the gates in the instruction decode section 144 and the location of the various gating circuits in the logic control section 136, since it is desirable that signals propagate from the instruction decoder section essentially downward to the appropriate register in the register section to avoid area-consuming cross-overs of conductors in the logic control section as they are routed through the appropriate bootstrap drivers or to the register coupling devices in the ALU.

The instruction register 146 was necessarily located at one end of the instruction decoder section 144 and also need to be located as near as possible to the data bus I/O buffers in section 130, since the input signals thereto are also the input signals to instruction register. This conveniently results in availability of a rather large region of chip area to the right of the logic controls section 136 for the decode logic 148 and the condition code register 150. Further, the decision logic 148 and the condition code register 150 provides enabling signals which extend into the logic control section 136. The decision logic circuitry essentially monitors the status of the condition code register to determine whether a branch operation will be performed by the logic control circuitry in section 136. In the operation of the chip, the Read/Write circuitry in section 52 has as its primary function determining the direction of data flow in the data bus I/O buffer section 150, making it desirable that section 152 be located adjacent to section 130.

The look-ahead circuitry for the instruction decoder section 144 may be located on the other end of the ROM instruction decoder. The I/O control circuitry 142 which includes reset circuitry, non-maskable interrupt (NMI) circuitry, interrupt request (IRQ) circuitry and bus available (BA) circuitry and three-state control (TSC), which all need to be located as close to the right hand end of the logic control section 136 as possible, since the chip area at the other end, the right hand side of the logic control circuitry is already occupied by decision logic 148 and condition code register 150.

It is necessary that the three-state control circuitry portion of the I/O control section 142 be located near the high order address buffers 124, since the purpose of the three-state control circuitry is to establish the high impedance (i.e., the three-state output mode) for all of the address buffers A$\phi$–A15.

It should be appreciated that during the layout design, i.e., the topology design, of microprocessor chip 10, trade-offs between the topology arrangement and the location of bonding pads are weighed balanced and in some cases the sequence of bonding pads, earlier determined by application requirements, had to be renegotiated and modified.

It should be recognized that a very high level of creativity is required of the chip architect in designing MOS LSI random logic chips such as are used in microprocessor or peripheral interface adaptor chips and the like because of the layout constraints for state-of-the-art manufacturing processes. For example, for silicon gate MOS manufacturing processes, the major constraints are the minimum widths and spacings of the diffused regions, the the minimum size required for preohmic openings in the field oxide, the spacings required from the edge of preohmic openings to the edge of diffused regions, minimum widths and spacings of polycrystalline silicon lines, the fact that such lines cannot cross over diffused regions, and the minimum widths and spacings between the metal lines, and of course the constraint that conductors in the same layer, i.e., diffused regions, polycrystalline silicon lines, or metallization lines cannot cross other of same type conductors. The high amount of capacitance associated with diffused regions and the resistances of both diffused lines and polycrystalline silicon lines and to a less extent of metal lines provide further design constraints upon the chip architect. For logic circuits which may be characterized as random logic, such as those in the subject invention, a large number of lines between sections of logic circuitry are required and the very large number of possibilities for routing the various kinds of conductors to the various required sections of the chip taxes the ingenuity of even the most competent chip topology architect, and further taxes the capacity of the most sophisticated computer interconnection conductor routing programs yet available. The computer aided design (CAD) approach has been applied to computerized random logic MOS LSI layouts for a number of years. However, it has been successful only to the extent that it provides rapid prototype designs having rather mediocre performance and requiring uneconomically large semiconductor chips. It is well established that the CAD programs currently available do not come close to matching human ingenuity in providing MOS LSI chip architectures which provide optimum performance while utilizing minimum silicon area. Clearly, there is a great deal of room for a high level of creativity in the design of MOS LSI chips. However, the economic rewards for success are substantial.

Other constraints faced by the chip architect are related to the environment in which the chip is expected to operate. For example, a chip expected to operate in a high noise environment may have substantial amounts of noise coupled to the various conductors within the chip. In a chip according to the subject invention, the N-Channel MOS manufacturing process utilizes relatively low MOSFET threshold voltages ($V_{TO}$), of the order of about one volt as opposed the higher voltage threshold voltages of 2–4 volts for earlier MOS manufacturing processes. The lower noise nunity of the N-Channel MOS threshold voltages
[me]ans that less noise may be coupled from conductors
[ext]ernal to the chip to critical logic circuitry within the
[chi]p.

Figure 9:
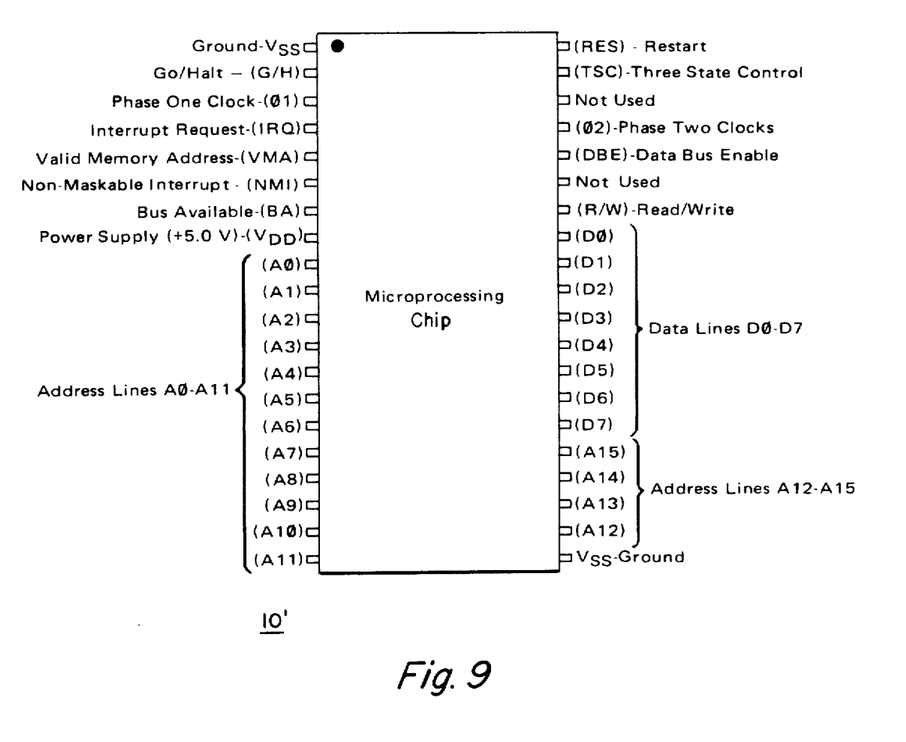
FIG. 9 is a drawing designating external lead assignments of a 40 pin dual-in-line package suitable for housing a microprocessor chip as illustrated in the earlier drawings.

A forty pin dual-in-line semiconductor package suitable for housing the peripheral interface adaptor chip described herein is illustrated in FIG. 9. A preferred sequence of external pin assignments is also illustrated [in] FIG. 8. The sequence of the pins is chose to provide [ma]ximum utility in placing packaged microprocessors [on] a printed circuit board. It is desirable that the $V_{SS}$ [an]d $V_{DD}$ voltage supply pins not be located close to [ea]ch other to avoid shorts. It is also desirable that they [no]t be symetrically located on the package so that if the [pa]ckage is inserted backward into the PC board with [po]wer applied damage to the semiconductor chip may [be] avoided. It is also desirable that the data bus input-[ou]tput pins D$\phi$–D7 be sequentially numbered and also [th]at the address output pins A$\phi$–A15 be sequentially [ar]ranged.

While the invention has been described with reference to several embodiments thereof, those skilled in [th]e art will recognize that the changes in form and [pl]acement of parts may be made to suit varying requirements within the scope of the invention.

What is claimed is:

1. An integrated circuit microprocessor chip having [fi]rst, second, third and fourth edges and a surface comprising:
   data bus means on said surface for transferring digital data;
   address bus means on said surface for transferring digital address information;
   register circuit means on said surface coupled to said data bus means and said address bus means for storing digital information received from said data bus means and said address bus means and transferring digital information to and from said data bus means and said address bus means in accordance with execution of program instructions by said integrated circuit microprocessor chip, said register circuit means being located closer to said first and second edges than to said third and fourth edges;
   address output buffer circuit means on said surface coupled to said address bus means for temporarily storing digital address information and transmitting said digital address information from said integrated circuit microprocessor chip, said address output buffer circuit means being located along said first and second edges between said first and second edges and said register circuit means;
   data input-output buffer circuit means on said surface coupled to said data bus means for tranferring said digital data to and from said integrated circuit microprocessor chip;
   logic control circuit means on said surface located along and spaced from said register circuit means coupled to said input-output buffer circuit means for generating a plurality of control signals for controlling transfers of data within said integrated circuit microprocessor chip; and
   driver circuit means on said surface coupled between said register circuit means and said logic control circuit means for enabling data transfer between said register circuit means and said address bus means and said data bus means.

2. An integrated circuit microprocessor chip as recited in claim 1 wherein said first, second third, and fourth edges circumscribe said integrated circuit microprocessor chip in a clock-wise sequence.

3. An integrated circuit microprocessor chip as recited in claim 1 further including arithmetic logic unit circuit means on said surface located between said register circuit means and said fourth edge coupled to said data bus means and said address bus means for performing digital computations.

4. An integrated circuit microprocessor chip as recited in claim 3 wherein said logic control circuit means includes instruction decoder circuit means for decoding an instruction to be executed by said integrated circuit microprocessor chip and generating a plurality of control signals, and also includes look-ahead circuit means for precharging conductors of said instruction decoder means coupled to said instruction decoder means and said data input-output buffer circuit means, said instruction decoder means being located closer to said third edge than to said driver circuit means, said look-ahead means being located closer to said second and third edges than to said first and fourth edges.

5. An integrated circuit microprocessor chip as recited in claim 4 further including instruction register circuit means coupled between said instruction decoder circuit means and said data input-output buffer circuit means located between said fourth edge and said instruction decoder circuit means.

6. An integrated circuit microprocessor chip as recited in claim 4 further including timing control circuit means located along said second edge adjacent said said logic control circuit means for generating enable signals to effect data transfers in said integrated circuit microprocessor chip.

7. An integrated circuit microprocessor chip as recited in claim 4 further including a condition control register circuit means located in said logic control circuit means between said arithmetic logic unit circuit means and said instruction register circuit means along said fourth edge and coupled to said data bus means for storing data in response to signals from said data input-output buffer circuit means to enable signal propagation from said instruction register circuit means through said control logic circuit means.

8. The integrated circuit microprocessor chip as recited in claim 7 further including read/write circuit means coupled between said condition code register circuit means and said data input-output buffer circuit means and coupled to said logic control circuit means for controlling whether said integrated circuit microprocessor chip undergoes a read or a write operation.

9. An integrated circuit microprocessor having first, second, third, and fourth edges and a surface comprising:
   data bus means;
   address bus means;
   a plurality of storage means for storing data coupled to said data bus means and said address bus means, said plurality of register means being located on said surface closer to said first and second edges than to said third and fourth edges;
   data input-output circuit means coupled to said data bus means for transferring data to and from said integrated circuit microprocessor, said data input-output circuit means being located substantially along said fourth edge and substantially adjacent and spaced from said storage means;

address output circuit means coupled to said address bus means for transmitting digital address information from said integrated circuit microprocessor located substantially adjacent said second edge between said second edge and said storage means; and control circuit means coupled to said storage means and said data input-output circuit means for controlling data transfers between said storage means and said data bus means, said address bus means, and said input-output circuit means, said control circuit means being located substantially between said register circuit means and said third edge.

* * * * *

UNITED STATES PATENT OFFICE
CERTIFICATE OF CORRECTION

Patent No. 3,987,418　　　　　　　　　　Dated October 19, 1976

Inventor(s) John K. Buchanan　　　　　　　　Page 1 of 2

It is certified that error appears in the above-identified patent and that said Letters Patent are hereby corrected as shown below:

The drawing on the cover sheet should appear as shown on the attached sheet.

Signed and Sealed this

Twenty-second Day of February 1977

[SEAL]

Attest:

RUTH C. MASON　　　　　　　　　　C. MARSHALL DANN
*Attesting Officer*　　　　　　　　　*Commissioner of Patents and Trademarks*